July 31, 1962 G. F. KRTOUS 3,047,671
SOUND MOTION PICTURE PROJECTOR
Filed May 29, 1959 11 Sheets-Sheet 1

INVENTOR.
George F. Krtous
BY
Robert F. Miehle
Att'y.

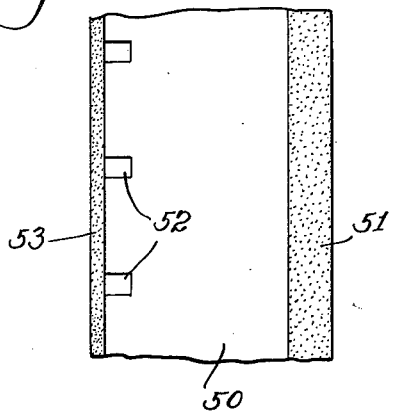
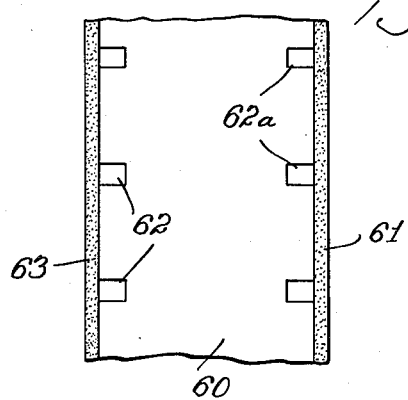
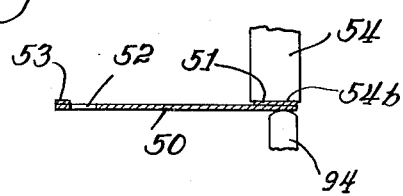
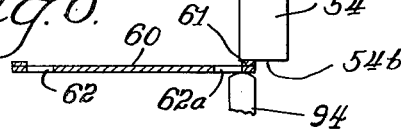
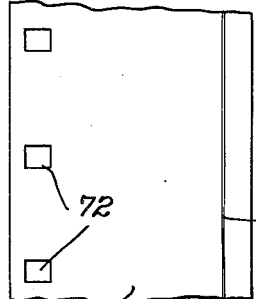
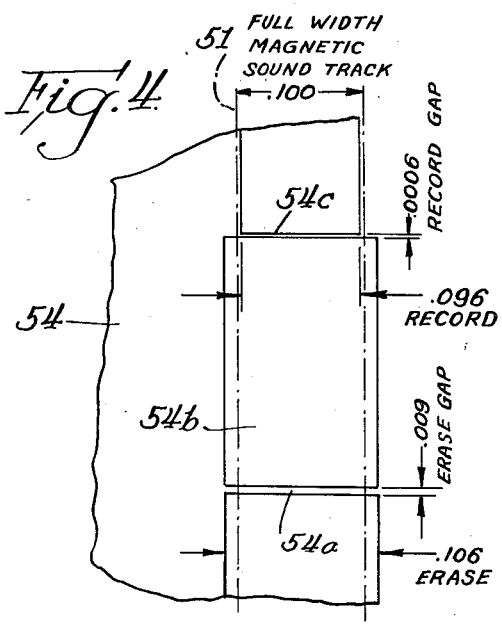
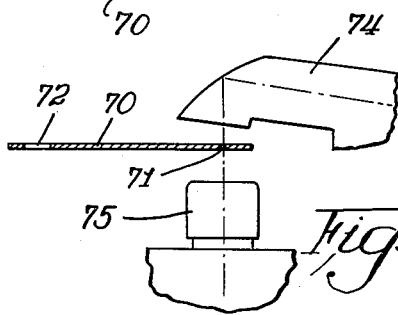

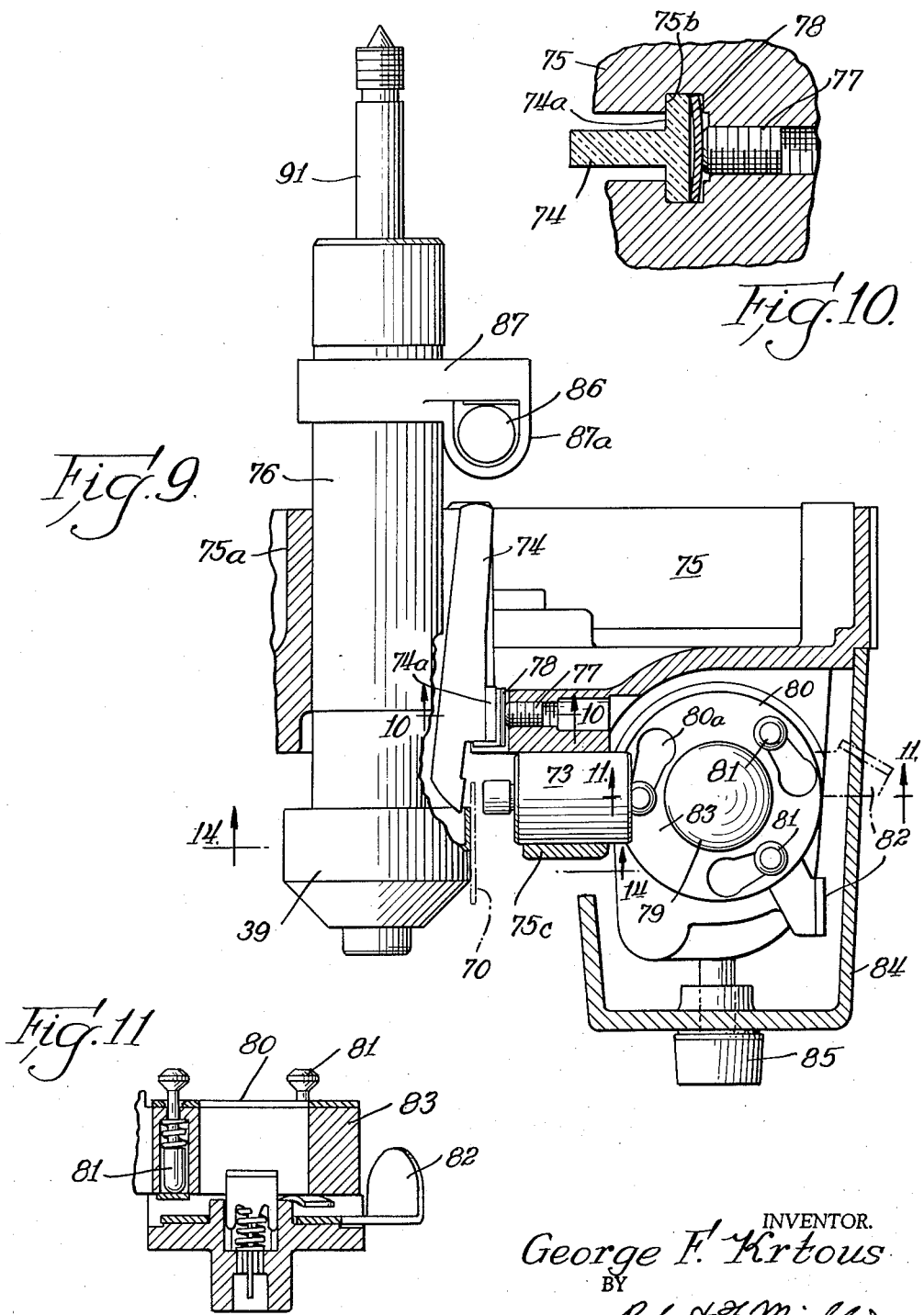

July 31, 1962 G. F. KRTOUS 3,047,671
SOUND MOTION PICTURE PROJECTOR
Filed May 29, 1959 11 Sheets-Sheet 4

INVENTOR.
George F. Krtous
BY
Robert F. Miehle
Atty.

July 31, 1962 G. F. KRTOUS 3,047,671
SOUND MOTION PICTURE PROJECTOR
Filed May 29, 1959 11 Sheets-Sheet 5
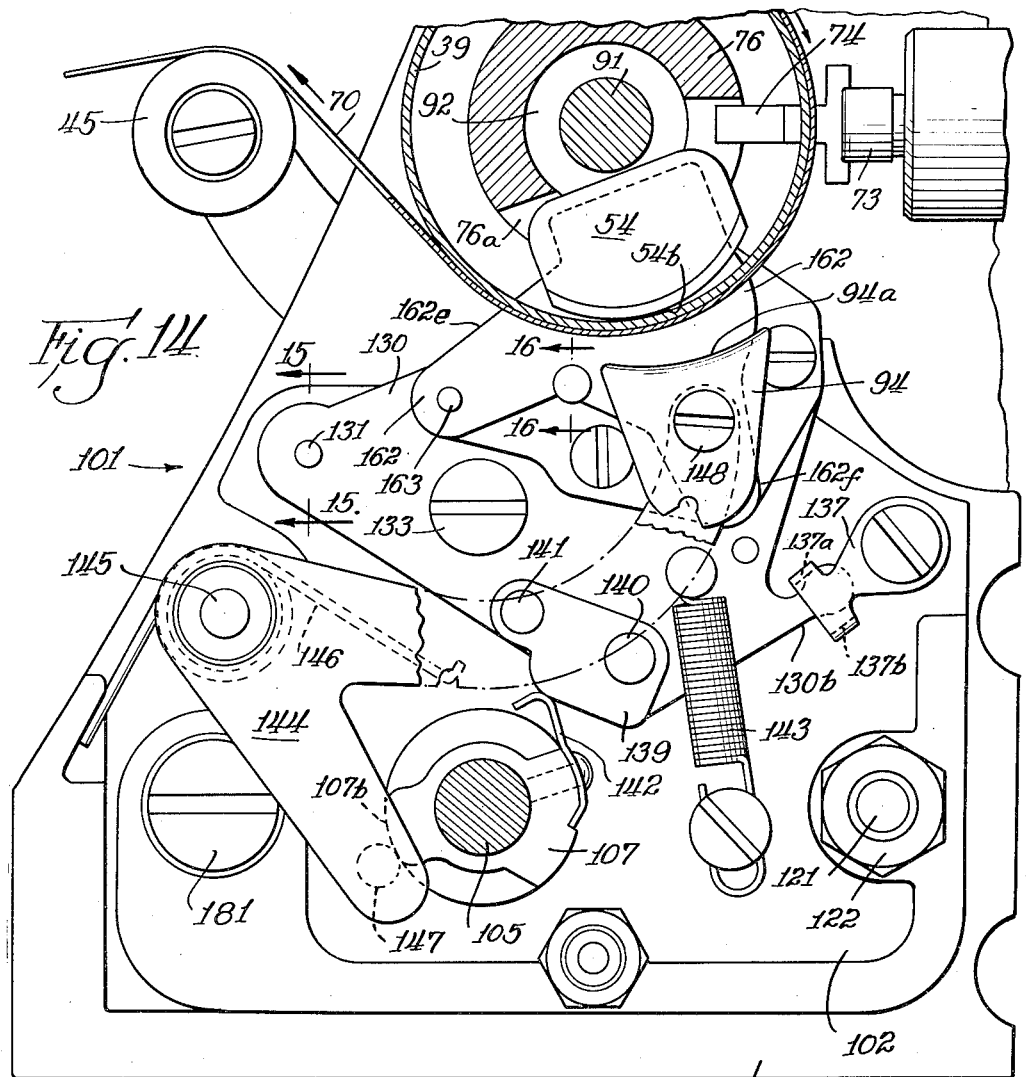
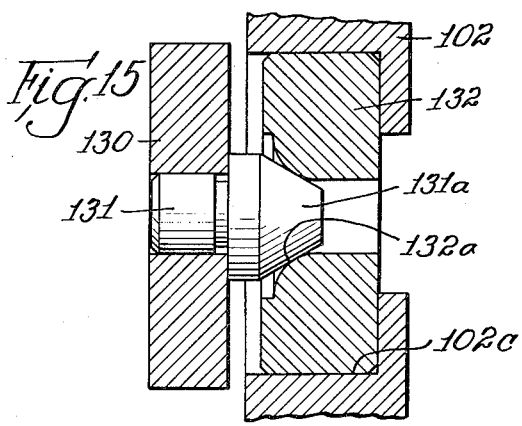
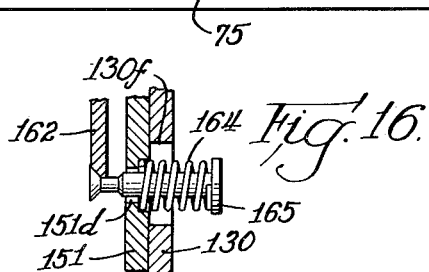
INVENTOR.
George F. Krtous
BY
Robert F. Miehle
Atty.

INVENTOR.
George F. Krtous
BY
Robert F. Miehle
Atty.

July 31, 1962 G. F. KRTOUS 3,047,671
SOUND MOTION PICTURE PROJECTOR
Filed May 29, 1959 11 Sheets-Sheet 9

INVENTOR.
George F. Krtous
BY
Robert F. Miehle Jr.
Atty.

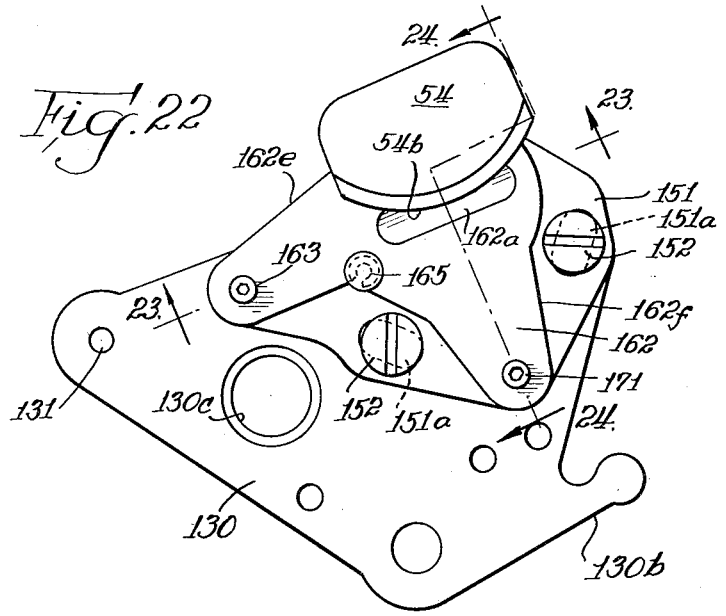
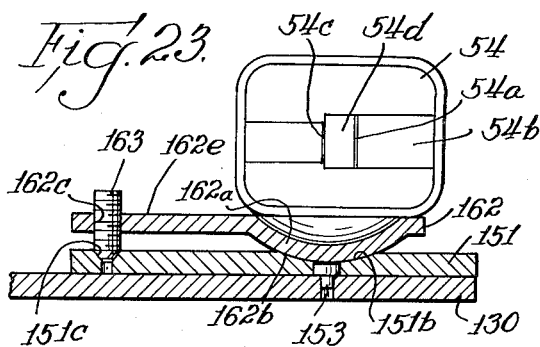
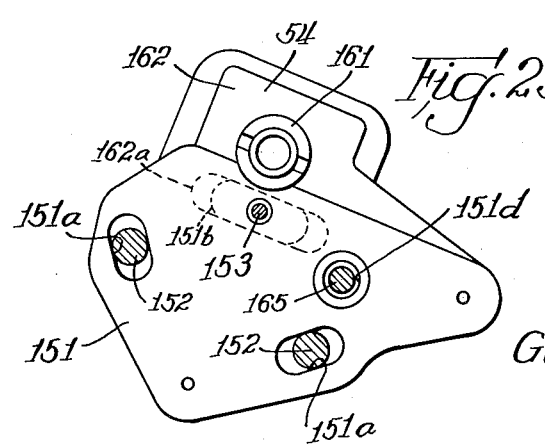
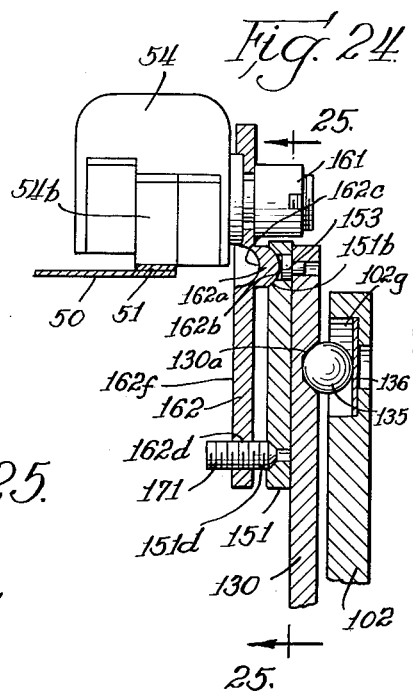

July 31, 1962 G. F. KRTOUS 3,047,671
SOUND MOTION PICTURE PROJECTOR
Filed May 29, 1959 11 Sheets-Sheet 11

INVENTOR.
George F. Krtous
BY
Robert F. Miehle
Att'y

United States Patent Office 3,047,671
Patented July 31, 1962

3,047,671
SOUND MOTION PICTURE PROJECTOR
George F. Krtous, Chicago, Ill., assignor to Bell & Howell Company, Chicago, Ill., a corporation of Illinois
Filed May 29, 1959, Ser. No. 816,813
7 Claims. (Cl. 179—100.1)

This invention relates to a sound motion picture projector, and more particularly to a motion picture projector adapted to reproduce sound selectively from an optical sound track, a half width magnetic track and a quarter width magnetic track.

An object of the invention is to provide a new and improved sound reproducing system in a motion picture projector.

Another object of the invention is to provide a magnetic sound system in which a sound head is precisely adjustable in three mutually perpendicular directions to locate the slit of the magnetic head precisely relative to the magnetic sound track of a film being projected.

Another object of the invention is to provide a sound projector having an optical and magnetic sound system in which the magnetic portion of the sound system may be installed into and removed from the projector as a unit.

Another object of the invention is to provide in a motion picture projector a magnetic sound head having a recording and reproducing slit portion and adjustable to a position in which the slit portion tangentially engages an edge portion of film traveling around a sound drum with the slit extending at a right angle to the longitudinal axis of the film and having a contacting portion parallel to the film along with having the magnetic sound head selectively movable between a position engaging a full width magnetic track on an unperforated edge of a film and a position engaging only a quarter width magnetic sound track positioned just outside perforations.

Another object of the invention is to provide a magnetic sound head having an arcuate contacting portion with a pick-up slit extending across the contacting portion together with an adjustment for turning the head about an axis perpendicular to the mouth of the slit to locate the mouth of the slit in a position extending directly across the film, an adjustment for locating the contacting portion in a position in which a line contact is effected with the film and another adjustment in which the arcuate contacting portion is rolled on the film to an optimum position for recording and reproducing.

A complete understanding of the invention may be obtained from the following detailed description of a sound type motion picture projector forming a specific embodiment thereof, when read in conjunction with the appended drawings, in which:

FIG. 2 is an enlarged, fragmentary plan view of a film having a full width magnetic sound track thereon and for use in the projector shown in FIG. 1;

FIG. 3 is a sectional view of the film shown in FIG. 2 along with a magnetic sound recording and reproducing head of the projector shown in FIG. 1;

FIG. 4 is an enlarged, fragmentary plan view of the magnetic sound head of the projector shown in FIG. 1 and illustrating the engaging recording and erasing gaps of the magnetic sound head;

FIGS. 5 and 6 are views corresponding respectively to FIGS. 2 and 3 but of a film having a quarter width magnetic sound track with the magnetic sound head shifted to cover only the sound track;

FIG. 7 is an enlarged, fragmentary plan view of a film having an optical sound track and for use in the projector shown in FIG. 1;

FIG. 8 is a sectional view of the film shown in FIG. 7 together with fragmentary illustrations of the optical sound system of the projector shown in FIG. 1;

FIG. 9 is an enlarged, fragmentary, horizontal sectional view of the optical sound system of the projector shown in FIG. 1;

Figure 1:
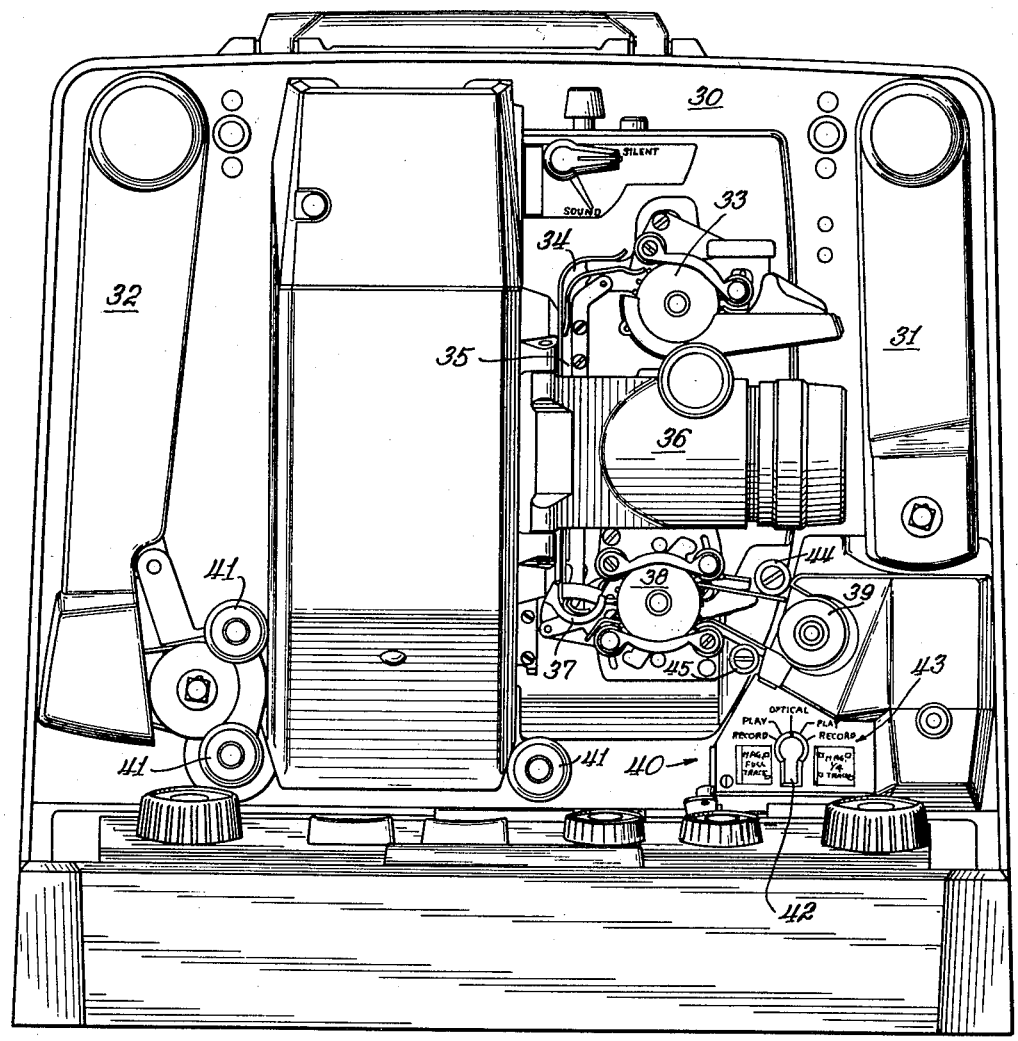
FIG. 1 is a side elevation view of a sound type motion picture projector forming one embodiment of the invention.
Figure 12:
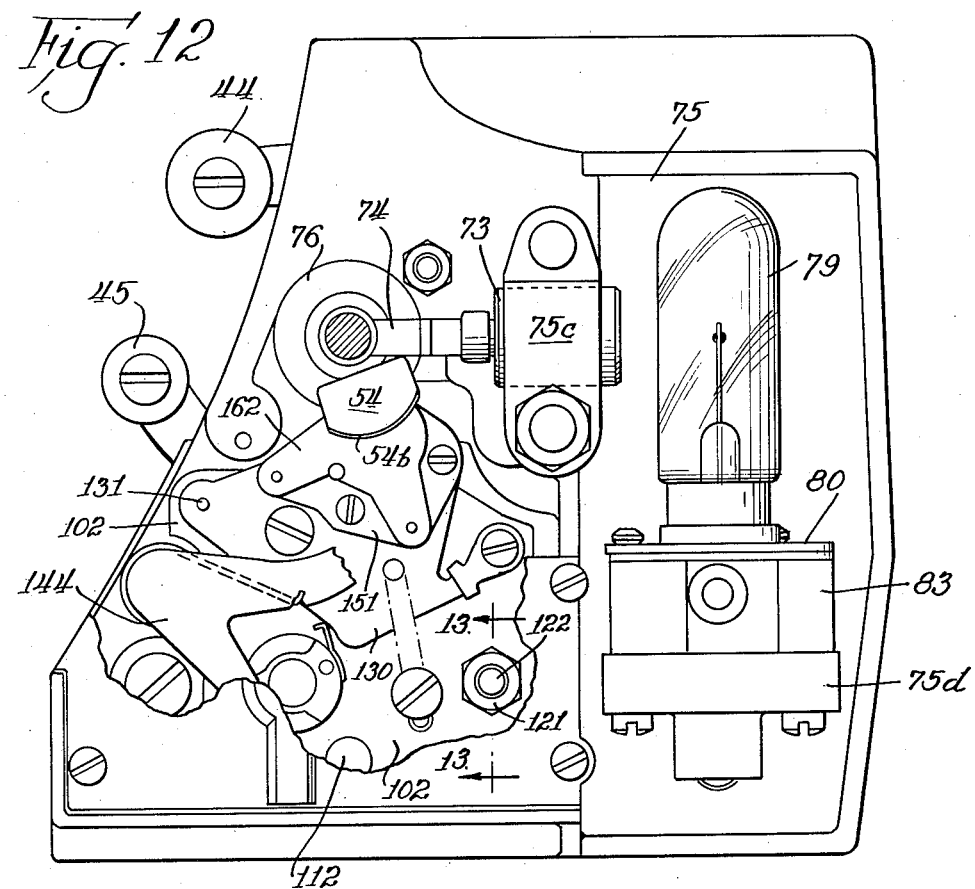
Figure 13:
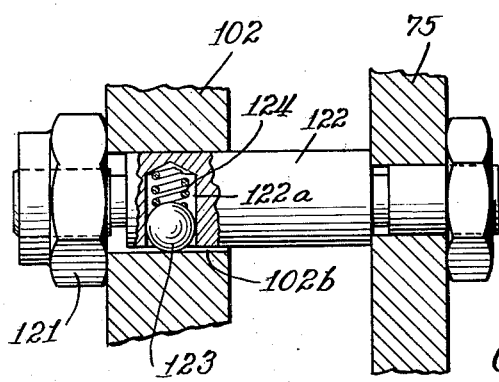

FIGS. 10 and 11 are vertical sectional views taken along lines 10—10 and 11—11 of FIG. 9;

FIG. 12 is an enlarged elevation view of the sound system of the projector shown in FIG. 1;

FIG. 13 is a vertical sectional view taken along line 13—13 of FIG. 12.

Figure 17:
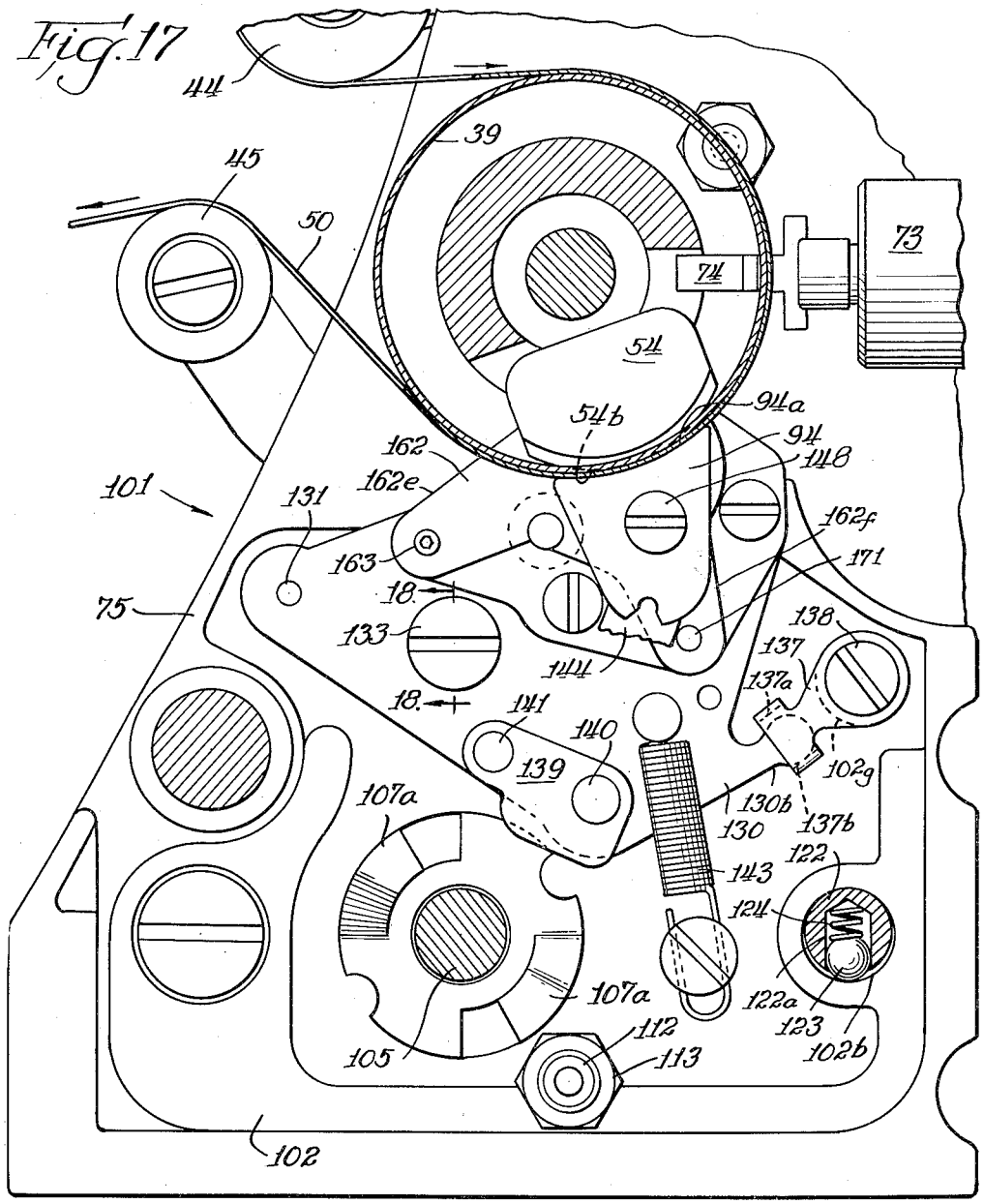
Figure 18:
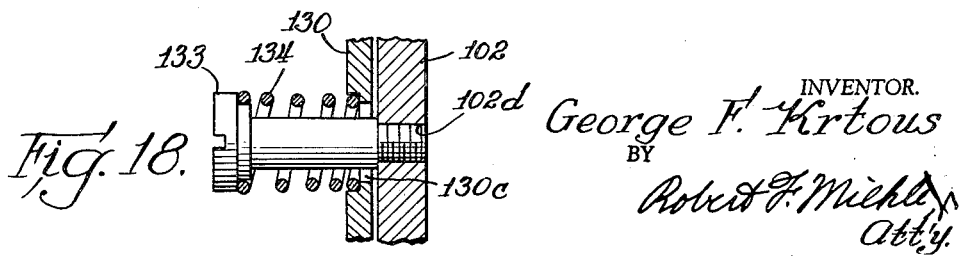
Figure 19:
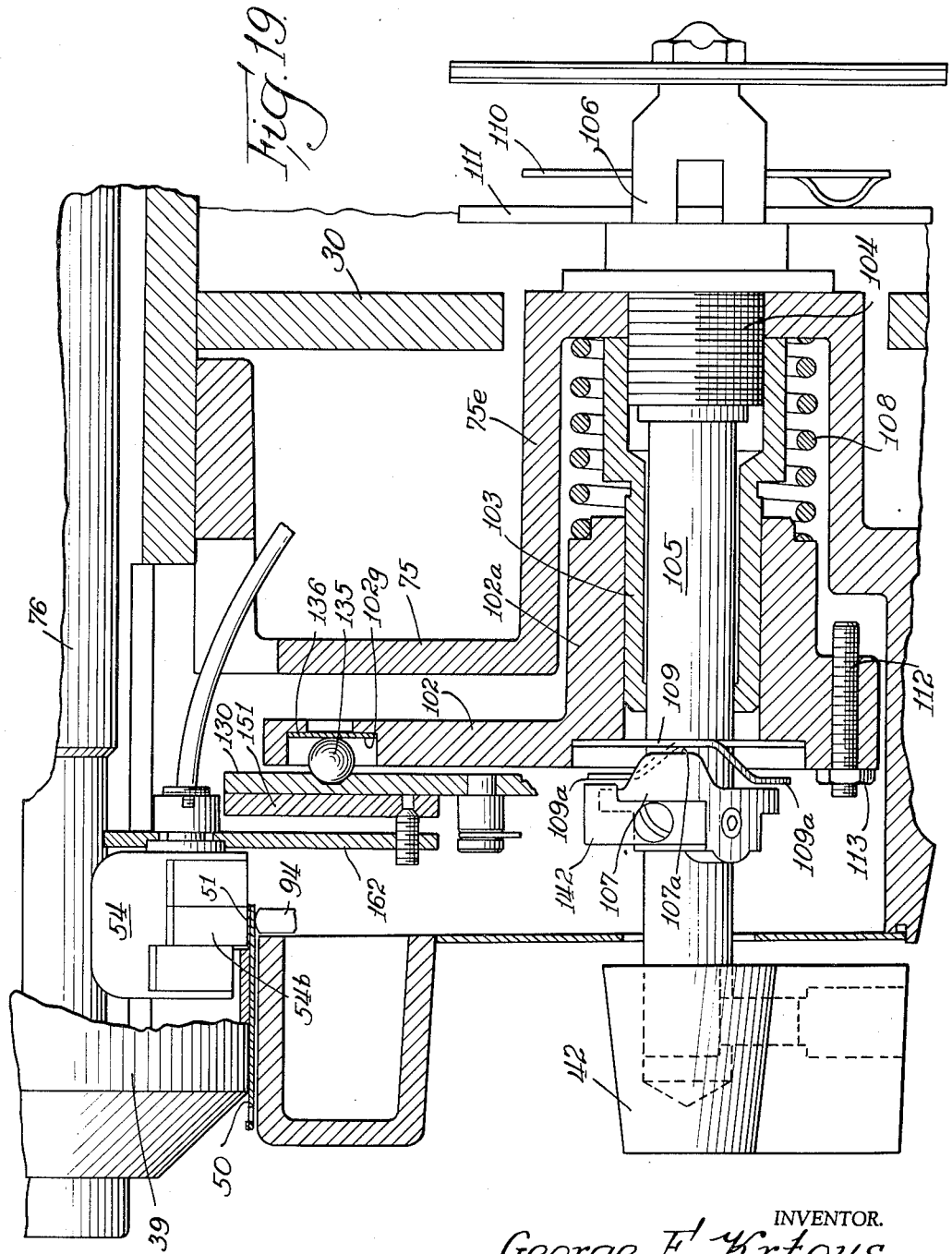
Figure 20:
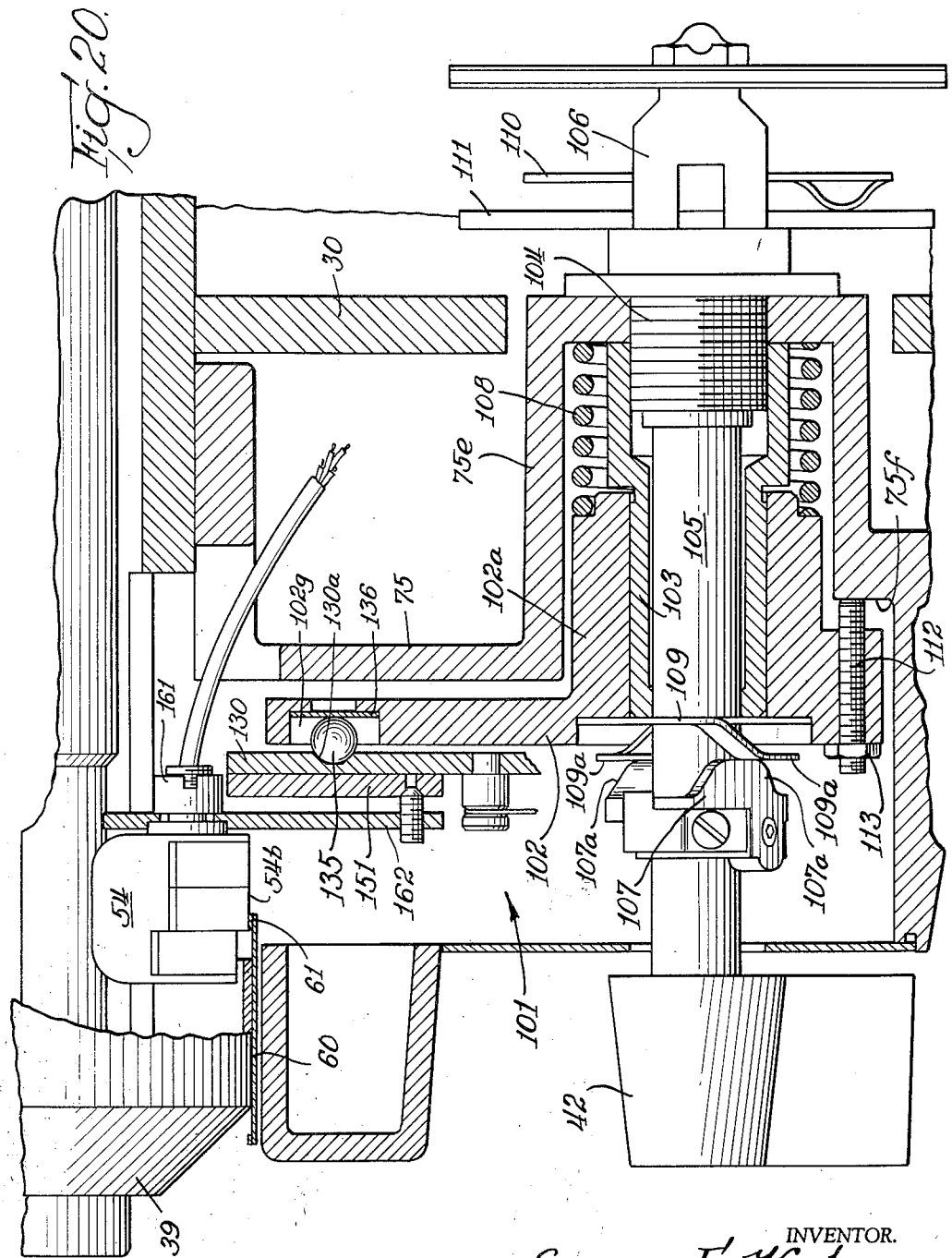
Figure 21:
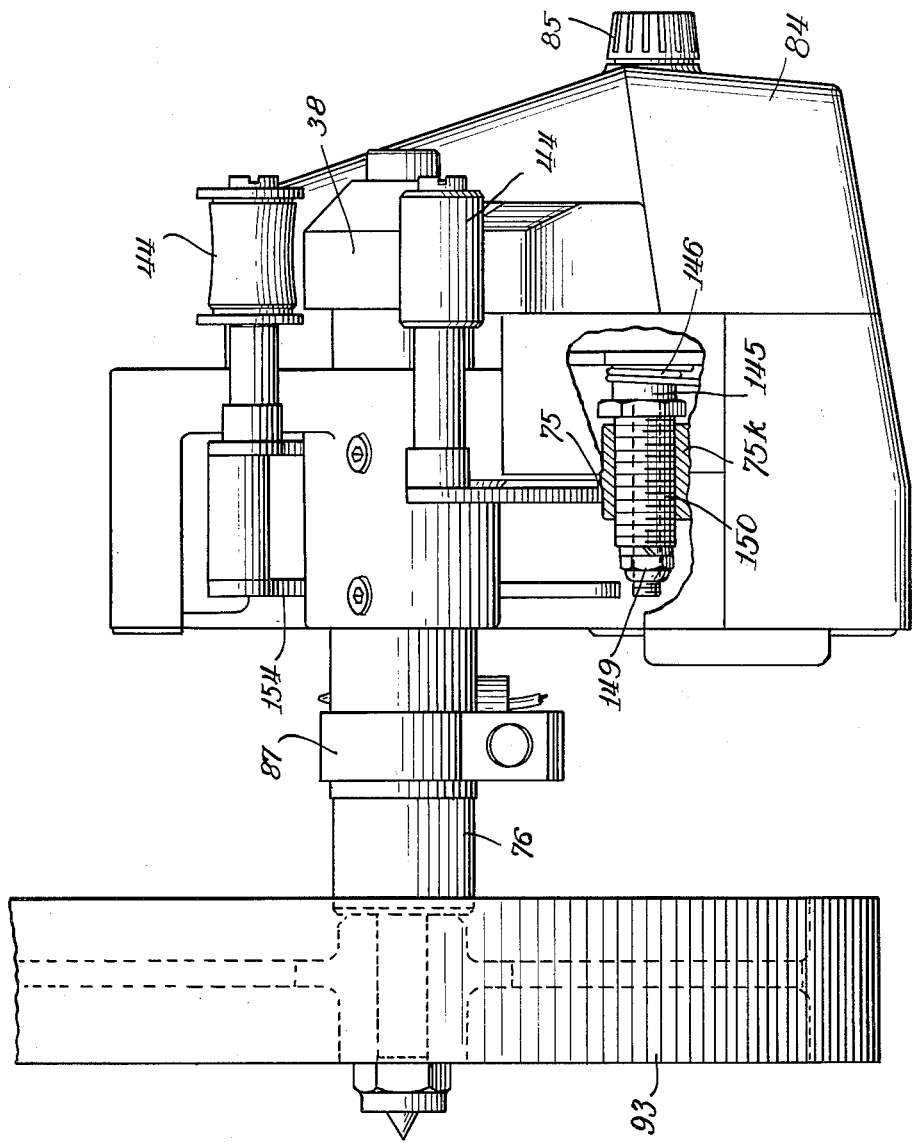
Figure 26:
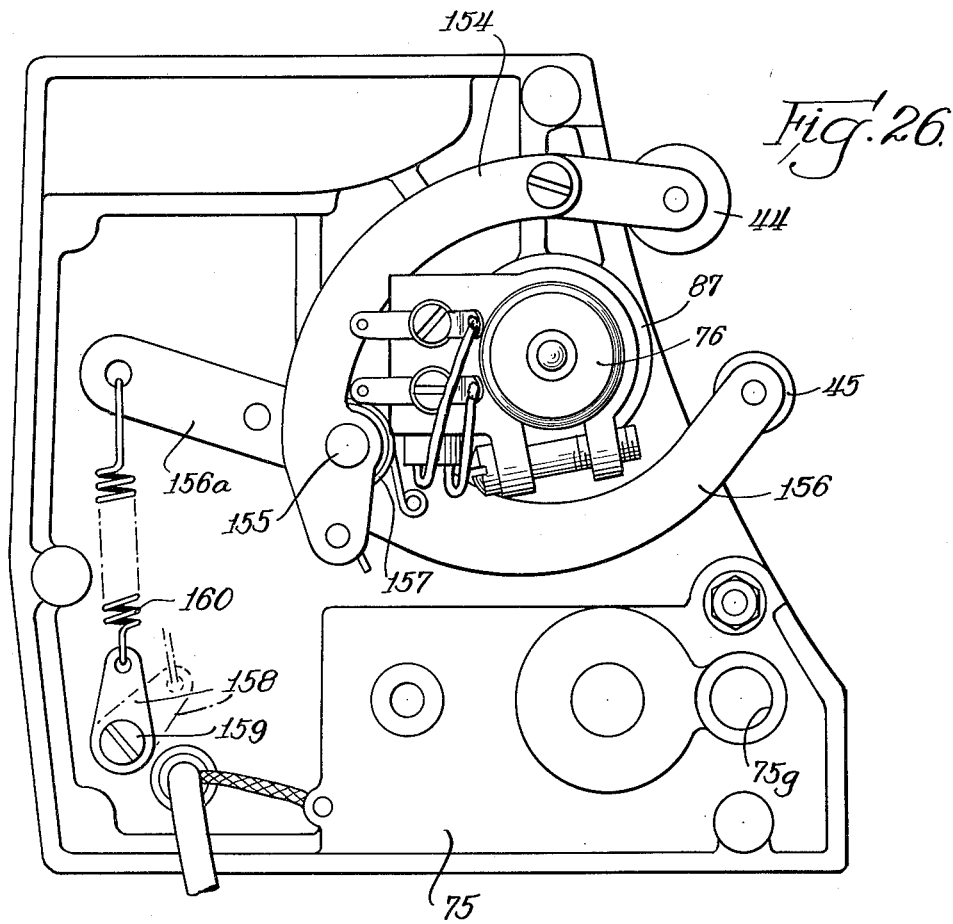
Figure 27:
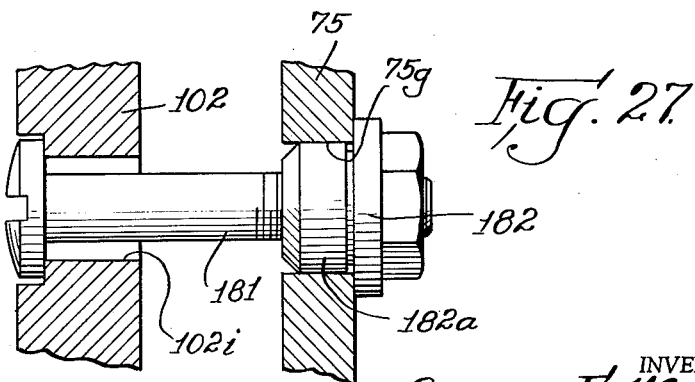

FIG. 14 is an enlarged, fragmentary, partially sectional view taken along line 14—14 of FIG. 9 with the magnetic sound head in a retracted position;

FIG. 15 is an enlarged vertical sectional view taken along line 15—15 of FIG. 14;

FIG. 16 is an enlarged vertical sectional view taken along line 16—16 of FIG. 14;

FIG. 17 is a view similar to FIG. 14 but with the magnetic sound head in operative postion;

FIG. 18 is an enlarged sectional view taken along line 18—18 of FIG. 17;

FIG. 19 is an enlarged, substantially vertical sectional view of the sound unit with the magnetic sound head in position to record on or reproduce sound from a full width magnetic sound track of a film;

FIG. 20 is a view similar to FIG. 19 but with the magnetic sound head shifted to a position to record on or reproduce sound from a quarter width magnetic sound track of a film;

FIG. 21 is an enlarged, fragmentary top plan view of the sound system of the projector shown in FIG. 1;

FIG. 22 is an enlarged elevation view of the magnetic sound head and the mounting structure therefor of the projector of FIG. 1;

FIG. 23 is a sectional view taken along line 23—23 of FIG. 22;

FIG. 24 is a sectional view taken along line 24—24 of FIG. 22;

FIG. 25 is an enlarged view taken along line 25—25 of FIG. 24;

FIG. 26 is an enlarged elevation view of the sound system of the projector shown in FIG. 1; and FIG. 27 is an enlarged vertical sectional view of a portion of the sound system.

The invention provides a sound system for a motion picture projector. The sound system may be assembled with and dis-assembled from the projector as a unitary assembly which preferably includes an optical sound system along with a magnetic sound sub-assembly which may, as a unit, be attached to and detached from the sound assembly. Preferably, the magnetic sound subassembly includes a magnetic sound head having an arcuate face for contacting the magnetic sound track of the film together with a sound slit opening onto the arcuate face. Mounting structure for the magnetic sound head may include an azimuth adjustment mechanism for adjusting the head to a position in which the sound slit opening extends directly across sound track, a parallel adjustment mechanism for adjusting the head to a position in which the sound slit opening engages the entire width of the sound track and a tangential adjustment mechanism for turning the sound head along the arcuate face thereof to position the slit in optimum tangential contact with the magnetic sound track, each of these adjustment mechanisms serving to effect its own adjustment without materially affecting the adjustments of the other two adjustment mechanisms. Preferably the sound head may be selectively shifted between one position in which the head extends completely over a full width magnetic sound track and a second position in which the head extends over only a quarter width magnetic sound track and not over perforations in the film adjacent to the sound track. Preferably the magnetic sound sub-assembly also has a presser for pressing the film against the sound head together with selectively operable means for retracting both the sound head and the presser from a film which has an optical sound track.

Referring now in detail to the drawings, the motion picture projector shown in FIG. 1 includes a vertical frame 30 on which is mounted foldingly a supply arm 31 and a take-up arm 32 for supporting and selectively driving supply and take-up reels (not shown). During projection, the film travels over upper sprocket 33, through an upper loop former 34, through a gate 35 formed partially by a hinged projection lens assembly 36, under a lower loop former 37, over a lower sprocket 38, around a sound drum 39 of a unitary magnetic-optical sound assembly 40, under the lower sprocket 38 and partially around guide rollers 41 to the take-up reel on the arm 32. There is a predetermined number of frames in the portion of the film between the frame at the aperture in the gate to the portion of the film at the portions of the film at the operative portions of the sound drum for synchronization as is well known in the art. The sound assembly 40 is selectively operable by a combined switch knob and pointer 42 to record sound on a full width magnetic track, record sound on a quarter width magnetic track, reproduce sound from a full width magnetic track, reproduce sound from a quarter width magnetic track and reproduce sound from an optical sound track, the pointer and indicia 43 designating the setting of the switch. Sound stabilizer rollers 44 and 45 are provided between the sound drum and the lower sprocket.

In FIGS. 2 and 3 there is shown a film 50 having a full width magnetic sound track 51 on the unperforated edge of the film, the other edge of the film having perforations 52 and a thickness balancing magnetic track 53. A magnetic sound head 54 is adapted to tangentially engage the entire width of the track 51 as the film is advanced therepast and a presser 94 holds the track 51 in such engagement with the head 54. The film is advanced sequentially past an erase gap or slit 54a opening into an arcuate face 54b and a record (and reproduce) gap or slit 54c also opening into the arcuate face and spaced about forty thousandths of an inch from the erase gap. The erase gap 54a extends equal distances beyond both edges of the full width magnetic sound track 51 as shown in FIG. 4 while the ends of the record gap are spaced inwardly slight, equal distances from the edges of the track 51. Dimensions in terms of inches are given for the widths and lengths of the gaps 54a and 54c and the width of the full width sound track 51.

A film 60 (FIGS. 5 and 6) of the older type having perforations 62 and 62a on both sides thereof has a quarter width magnetic sound track 61 thereon along with a thickness balancing magnetic track 63. In order that the sound head 54 be not disturbed by the edges of the perforations 62a, which sometimes project out of the plane of the film 60, the sound head 54 is shifted from its position shown in FIG. 3 to that shown in FIG. 5 in which latter position the left hand edge of the gap 54a extends beyond the track 61 three thousandths of an inch and the left hand end of the record gap 54c is two thousandths of an inch from the left hand edge of the track 61, the gaps 54a and 54c extending beyond the right hand edge of the track 61. The left hand edge of the presser 94 is spaced somewhat to the right of the right hand edges of the perforations 62.

In FIGS. 7 and 8, a film 70 having an optical sound track 71 and perforations 72 is shown. For sound reproduction, the sound track travels between a lens system 73 and a light-pipe or prism 74. The dimensions of the film 70 are the same as those of the film 50 and the width and location on the film of the track 71 are identical with those of the full width magnetic sound track 51. Certain features of the light-pipe 74 and the optical sound system are disclosed and claimed in co-pending application Serial No. 814,774, filed May 21, 1959, and assigned to the same assignee as the present invention. The light-pipe 74 is mounted on a sound assembly frame or casting 75 (FIGS. 9 and 10) in a position extending into a slot in a bearing mounting sleeve 76 releasably fixed in journal portion 75a by set screws (not shown). The light-pipe has a T-shaped mounting portion 74a secured in a T-shaped slot 75b in the frame 75 by a set screw 77 and a bowed leaf spring 78 which exerts pressure only on the supported edges of the mounting portion 74a. The lens system 73 is mounted in split clamp portion 75c of the frame in a position aligned with an exciter lamp 79 mounted on an adapter base 80. The base 80 has slots 80a through which spring-pressed, headed pins 81 project. When a release lever 82 is in its full-line position shown in FIG. 9, the pins clamp the adapter base 79 to socket 83 in operative position. After a housing or cover 84 is detached from the frame 75 by unscrewing screw 85, the lever 82 may be swung manually to its broken-line position of FIG. 9 (full-line position of FIG. 11) to cam the pins 81 upwardly to their releasing positions and the lamp and adapter base then may be removed from the socket 83. It should be noted that the lever 82 must be in its locking position before the cover 84 can be replaced on the frame 75. During projection of the film 70, the film 70 travels around the drum 39 and between the lens system 73 and the light-pipe 74. Light from the lamp 79 travelling through the lens system 73 to the film 70 is valved by the optical sound track and travels through the light-pipe 74 to a photoelectric cell 86 mounted by a bracket 87a of a split clamp 87 fixed to the sleeve. The socket 83 is mounted on an integral bracket 75d (FIG. 12) of the frame 75.

The sound drum 39 is keyed to a shaft 91 (FIGS. 9 and 14) rotatably mounted in the sleeve 76 by radial-and-thrust bearings 92 mounted in the sleeve 76. The sound drum and shaft 91 are rotated by the film 50, 60 or 70 at a speed made uniform by a flywheel 93 (FIG. 21), and the grooved stabilizer roll 44 guides the film precisely to the sound drum. As best illustrated in FIGS. 14 and 17, the film travels sequentially past the optical sound pick-up (comprising the light-pipe 74 and lens system 73) and the magnetic sound head 54 which is spaced quite closely to the optical sound pick-up. Clearance is provided for the head 54 by a slot 76a in the sleeve 76. The head 54 and presser 94 are selectively movable between retracted positions shown in FIG. 14 completely out of contact with the film to operative positions shown in FIG. 17 in which the head engages the magnetic sound track 51 or 61 on the film and the presser is lightly urged against the other side of the film to keep the magnetic sound track in contact with the sound head 54.

The magnetic sound head 54 forms a part of a unitary magnetic sound sub-assembly 101 including a plate-like casting or frame 102. The sub-assembly 101 is assembled separately and then mounted on or dismounted from the sound assembly 40 as a unit. The frame 102 has a sleeve portion 102a mounted slidably on a bushing 103 fixed to the frame 75 by a flanged bearing sleeve 104 threaded into the bushing 103. The bushing 103 and sleeve 104 mount switch shaft 105 rotatably, and the shaft is held against thrust by an enlarged head 106 and a cam 107 fixed to the shaft 105. A compression spring 108 seated in tubular recess 75c and bearing against the sleeve portion 102a urges the frame 102 to the left, as viewed in FIGS. 19 and 20, to urge a face cam follower plate 109 keyed to the frame 102 against lobes 107a of the cam 107.

When the knob 42 is turned to either "Play" or "Record" (FIG. 1) for the quarter width magnetic sound track 61 (FIG. 5), the knob 42 turns the shaft 105 (FIGS. 19 and 20) to turn the head and a switch contactor 110 relative to a switch member 111 carrying switch contacts to the several circuits (not shown) to make the desired electrical connections for either of these settings of the switch. As the shaft 105 is so turned to one of the two quarter width positions, the lobes 107a engage spring arms 109a of the cam follower plate 109 and move the frame 102 to the quarter width track position thereof shown in FIGS. 5, 6 and 20. An adjustment screw 112 fixed adjustably to the frame 102 by nut 113 engages shoulder 75f to precisely position the frame 102.

When the knob 42 is turned manually to either "Optical," or "Play" or "Record" (FIG. 1) for the full width magnetic sound track, the lobes 107a are moved from the positions thereof shown in FIG. 20 to those shown in FIG. 19 in which the lobes 107a are out of alignment with the spring arms 109a, and the spring 108 urges the frame 102 to the position thereof shown in FIG. 19 in which the magnetic head 54 extends fully over the full width magnetic track 51. The full width track position of the frame 102 is determined by a nut 121 (FIGS. 12 and 13) adjustably mounted on guide rod 122 fastened rigidly to the sound assembly frame 75. The rod 122 extends loosely through a bore 102b to permit free sliding of the frame 102 on the rod 122, a ball 123 slidable and rotatable in bore 122a and pressed by compression spring 104 serving to engage the bore 102b to precisely position the frame 102. Thus, the mounting structure of the frame 102 comprises the rigidly mounted bushing 103 to which the frame fits closely and slidably and on the rigidly mounted rod or stud 122.

The carrier plate or frame 102 and a pin 131 support a mounting plate or arm 130 pivotally thereon, and the pin 131 has a tapered head 131a fitting pivotally in a rounded, tapered socket 132a in a pivot bearing 132 press fitted into counterbore 102c. A compression spring 134 (FIG. 18) compressed by screw 133 threaded into tapped bore 102d and through clearance slot 130c urges the plate 130 toward the frame 102 to seat the pin 131 in the pivot bearing 132 and holds the plate 130 against two balls 135 seated rotatably in recesses 130a and freely rotatable along hardened plates 136 seated in arcuate grooves 102g in the frame 102. The plate 130 has a finger 130b (FIG. 17) projecting between stop tabs 137a and 137b of a bracket 137 secured adjustably to a boss 102h by a screw 138. A cam follower plate 139 secured to the plate 130 by a rivet 140 and a pin 141 is engageable by a spring radial cam arm 142 (FIGS. 14 and 19) fixed to the cam 107 when the switch knob 42 is moved to "Optical" (FIG. 1). In this position, the cam arm 142 (FIG. 14) holds the plate 130 in a retracted position in which the finger 130a against stop tab 137a of bracket 137. In this "Optical" position, the plate 130 holds the sound head 54 in a retracted position relative to the sound stripe on the film against the action of tension spring 143 as illustrated in FIG. 14. At this time, a radial cam lobe 107b holds a bell-crank lever 144 in the retracted position. The lever 144 is integral with shaft 145 which is urged counter-clockwise, as viewed in FIG. 14, by torsion spring 146. The shaft 145 has a thrust nut 149 (FIG. 21) thereon and is journaled in a threaded bushing 150 adjustably mounted in tapped sleeve 75k of the frame 75. The lobe 107b engages follower pin 147 carried by the lever 144. Whenever the shaft 105 is not in the "Optical" position, the lobe 107b is not in engagement with the pin 147 and the spring 143 moves the finger 130b against the tab 137b of the stop 137, in which position the contacting surface 54b of the sound head engages the magnetic sound track tangentially. Also, the spring 146 urges the lever 144 counter-clockwise to urge the presser 94 against the film to hold the magnetic sound track against the contacting face 54b. Contacting edge face 94a of the presser has a radius just slightly greater than the external periphery of the sound drum 38 as illustrated in FIG. 17, the difference in these radii being somewhat greater than the thickness of the film. A screw 148 clamps the presser 94 tightly against the face of the lever 144.

A tangential adjustment plate 151 (FIGS. 22 and 25) is carried pivotally adjustably on the plate 130 by screws 152 projecting through arcuate slots 151a and threaded into tapped bores in the plate 130. By loosening the screws 152, the plate 151 may be pivoted on pin 153 (FIGS. 23 and 24) to adjust the sound head 54 to precisely adjust the contacting face 54b to present the optimum portion of the face 54b into tangential contact with the film, the arcuate face 54b having somewhat smaller radius than that of the portion of the sound track 51 or 61 which it contacts so that there is a tangential contact of the sound track on the arcuate face 54b. For this reason, this adjustment is designated the tangential adjustment.

The stabilizer roll 44 is mounted on a trussed lever 154 (FIGS. 21 and 26) pivotal on shaft 155 journaled in the frame 75. A lever 156 mounting the roll 45 is keyed to the shaft 155 and a torsion spring 157 urges the levers in directions urging the rolls 44 and 45 toward one another. An arm 158 fixed adjustably to the frame 75 by screw 159 is connected to one end of tension spring 160. The spring 160 is secured to arm 156a of the lever 156 to act as a counter-balance for the levers 154 and 156 with the rolls 44 and 45, the levers 154 and 156 extending generally horizontally from the shaft 155.

The sound head 54 is fastened by a screw 161 (FIG. 24) rigidly to a mounting or rocker plate 162, and the plate 162 provides for both the azimuth adjustment of the magnetic sound head 54 and the parallel adjustment of the sound head. The plate 162 has a rounded embossment 162a having an arcuate face 162b (FIG. 23) having as its center a point 54d midway between the central portions of the record gap 54c and the erase gap 54a. The plate 162 has arms 162e and 162f extending at a right angle relative to one another. The projection 162a fits into a socket 151b which is complementary to the projection 162a and forms a ball and socket joint therewith. By adjusting an azimuth adjustment screw 163 threaded through tapped bore 162c the arcuate face 162b is pivoted in the socket 151b about the point 54d to pivot the gaps 54a and 54c to positions extending transversely to the longitudinal axis of the magnetic sound tracks 51 and 61 as these tracks travel past the gaps. The screw 163 has a tapered end 163a fitting into tapered socket 151c. A compression spring 164 (FIG. 16) acts on a headed pin 165 to hold the screw 163 and the projection 162a seated in the sockets 151c and 151b, respectively, the pin 165 extending loosely through clearance holes 130f and 151d in the plates 130 and 151. It will be apparent that manipulation of the screw 163 (FIG. 23) to precisely position the gaps 54a and 54c does not affect the tangential adjustment of the head 54.

To effect parallel adjustment of the head 54 relative to the path of the sound tracks 51 and 61, a parallel adjustment screw 171 is threaded through a tapped bore 162d (FIG. 24) and has a tapered end 171a fitting into tapered socket 151d. The screw 171 is located on a line from the center of the projection 162a substantially perpendicular to a line extending between the center of the projection 162a and the azimuth adjustment screw 163. The radius of the projection 162a transverse to the long dimension thereof as illustrated in FIG. 24 is quite short as compared to the radius thereof as shown in FIG. 23, and adjustment of the screw 171 swings the plate 162 and the head 54 about a center point 162e to make the contacting portion of the face 54b extend across the magnetic sound track parallel to the face of the tape as is illustrated in FIG. 24. It will be noted that the parallel adjustment of the head 54 does not substantially affect either the azimuth adjustment or the tangential adjustment. Suitable leads (not shown) extend from the head 34 to the interior of the projector and are connected into the amplifier of the projector in a well known manner.

As is illustrated in FIG. 27, a screw 181 projecting loosely through a bore 102i in the frame 102 is mounted rigidly and adjustably on the frame 75 by a nut 182 having a shank 182a fitting into bore 75g. The head of the screw acts with the nut 122 to limit movement of the frame 102 to the right, as viewed in FIG. 20.

The magnetic sound sub-assembly 101 may be assembled as a unit and inserted as a unit into the sound assembly 40 and removed as a unit therefrom. The head 54 may be adjusted selectively as to azimuth, tangency and parallelism, and each adjustment has a negligible effect on the other adjustments.

While the invention is thus described, it is not wished to be limited to the precise details described, as changes may be readily made without departing from the spirit of the invention.

What is claimed is:

1. In a sound type motion picture projector including a sound drum for engaging a portion of a film, light projecting means for projecting light through the portion of the film at a predetermined point in the path of travel of the film around the drum, a light pipe for receiving the light travelling through the film at one point in the travel of the film around the drum and a frame mounting the light projecting means, a magnetic sound sub-assembly comprising guide means on the frame, a mounting member slidable on the guide means, a pivot plate mounted pivotally on the mounting member, a tangential adjustment plate mounted for pivotal adjustment on the pivot plate and having a socket portion, a rocker plate having a rounded projection fitting into the socket to form a ball and socket joint therewith, azimuth adjustment means for pivoting the rocker plate about one axis relative to the tangential adjustment plate, parallel adjustment means for pivoting the rocker plate relative to the tangential adjustment plate about a second axis at a right angle to said one axis, and a magnetic sound head mounted on the rocker plate and having an arcuate face and a sound gap extending across the arcuate face, the head being mounted on the rocker plate in a position such that the center of curvature of the arcuate face is in a plane generally perpendicular to said one axis and said second axis and the sound gap is spaced around the drum from said one point.

2. The sound type motion picture projector defined by claim 1 and including switch means for switching between full width magnetic sound and quarter width magnetic sound, and means operable by the switch when switching to between quarter width magnetic sound and full width magnetic sound for shifting the mounting member between a position holding the arcuate face of the sound head in a position over-lapping only a quarter width magnetic sound track on a film travelling around the drum and a position over-lapping a full width magnetic sound track on a film travelling around the drum.

3. The sound type motion picture projector defined by claim 1 and including manually operable switch means having a shaft extending parallel to the guide means, face cam means on the shaft for shifting the mounting member along the guide means between two positions, and radial cam means on the shaft for moving the pivot plate between a position holding the arcuate face of the sound head in engagement with a magnetic sound track and a second position holding the arcuate face of the sound head out of engagement with the track.

4. In a sound system, a pair of parallel guide members, a frame mounted slidably on the guide members and having arcuate grooves therein, a pivotal plate mounted pivotally on the frame having a projecting finger and also having ball sockets, balls fitting into the grooves and the sockets, a stop bracket secured adjustably to the frame and having stop tabs bracketing the finger, a tangential adjustment plate having an elongated rounded socket, means centered on the elongated rounded socket mounting the adjustment plate pivotally on the pivotal plate, means for locking the adjustment plate in adjusted position relative to the pivotal plate, a rocker plate having a projection complementary to the elongated rounded socket and forming a ball and socket joint therewith, the rocker plate also having a first arm extending in the same direction as the elongated rounded projection and a second arm extending transversely to the first arm, means urging the rocker plate toward the adjustment plate to seat the projection in the elongated rounded socket, a first adjustment screw carried by the first arm for engaging the adjustment plate, a second adjustment screw carried by the second arm for engaging the adjustment plate, and a magnetic sound head carried on the rocker plate.

5. The sound system defined by claim 4 and including, a bell-crank lever mounted on the frame, a presser mounted on the lever, means urging the lever in a direction moving the presser toward the sound head, means urging the pivotal plate in a direction moving the sound head toward the presser, and cam means journaled on the frame for moving the lever and the pivotal plate against the urging means to retracted positions.

6. In a sound system, guide means, a frame mounted slidably on the guide means, a pivotal plate mounted pivotally on the frame, stop means to the frame for limiting pivotal movement of the plate relative to the frame, a tangential adjustment plate having an elongated rounded socket, means centered on the elongated rounded socket mounting the adjustment plate pivotally on the pivotal plate, means for locking the adjustment plate in adjusted position relative to the pivotal plate, a rocker plate having a projection complementary to the elongated rounded socket and forming a ball and socket joint therewith, means urging the rocker plate toward the adjustment plate to seat the projection in the elongated rounded socket, a first adjustment screw carried by the rocker plate for engaging the adjustment plate, a second adjustment screw carried by the rocker plate for engaging the adjustment plate, and a magnetic sound head carried on the rocker plate.

7. In a sound type motion picture projector, a sound drum for engaging a portion of a film, a mounting frame, guide means on the frame, a mounting member slidable on the guide means, a pivot plate mounted pivotally on the mounting member, a tangential adjustment plate mounted for pivotal adjustment on the pivot plate and having a socket portion, a rocker plate having a rounded projection fitting into the socket to form a ball and socket joint therewith, azimuth adjustment means for pivoting the rocker plate about one axis relative to the tangential adjustment plate, parallel adjustment means for pivoting the rocker plate relative to the tangential adjustment plate about a second axis at a right angle to said one axis, and a magnetic sound head mounted on the rocker plate and having an arcuate face and a sound gap extending across the arcuate face, the head being mounted on the rocker plate in a position such that the center of curvature of the arcuate face is in a plane generally perpendicular to said one axis and said second axis.

References Cited in the file of this patent

UNITED STATES PATENTS

| | | |
|---|---|---|
| 2,668,879 | D'Arcy | Feb. 9, 1954 |
| 2,680,785 | Franklin | June 8, 1954 |
| 2,786,897 | Schwarz | Mar. 26, 1957 |
| 2,912,519 | Simmons | Nov. 10, 1959 |